United States Patent [19]
Amano

[11] Patent Number: 5,822,528
[45] Date of Patent: Oct. 13, 1998

[54] AUDIO-VIDEO DATA TRANSMISSION APPARATUS, AUDIO-VIDEO DATA TRANSMISSION SYSTEM AND AUDIO-VIDEO DATA SERVER

[75] Inventor: Naoki Amano, Kanagawa, Japan

[73] Assignee: Sony Corporation, Tokyo, Japan

[21] Appl. No.: 721,624

[22] Filed: Sep. 26, 1996

[30] Foreign Application Priority Data

Oct. 3, 1995 [JP] Japan .................................. 7-256088

[51] Int. Cl.$^6$ .................................................. G06F 15/16
[52] U.S. Cl. ........................ 395/200.47; 348/7; 455/4.2
[58] Field of Search ........................ 395/200.47; 348/7, 348/12, 13, 473, 484, 716; 455/4.2, 5.1; H04N 7/10

[56] References Cited

U.S. PATENT DOCUMENTS 5,546,118  8/1996  Ido .............................................. 348/7
5,583,937  12/1996  Ullrich ...................................... 380/20

FOREIGN PATENT DOCUMENTS 0707423  4/1996  European Pat. Off. .

*Primary Examiner*—Sherrie Hsia
*Attorney, Agent, or Firm*—Frommer Lawrence & Haug LLP; William S. Frommer

[57] ABSTRACT

An AV data transmission apparatus including an AV data storage unit for storing AV data comprising a single program and having audio data and/or video data, a reference time generating unit for generating a signal showing a predetermined reference time, a reproducing unit for reading out the stored AV data and preparing a plurality of channels of AV data comprising the single program for each channel and comprising the plurality of channels of AV data to be reproducible from the beginning of the program in order at predetermined time intervals from the reference time and comprising the predetermined time intervals to be shorter the closer to the reference time the channels are to be reproduced, and a data transmitting unit for converting the plurality of the AV data into a predetermined transmission format and transmitting the same to a plurality of transmission channels and AV data server provided with a plurality of such data transmission apparatuses.

8 Claims, 5 Drawing Sheets

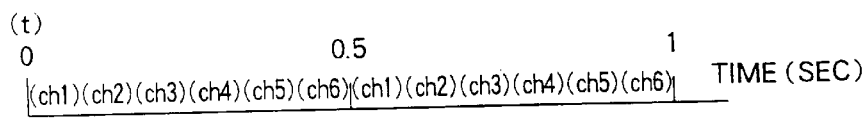
FIG.4(A) t=t0
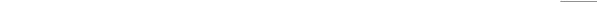
FIG.4(B) t=t1
FIG.4(C) t=t2
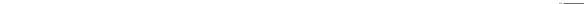
FIG.4(D) t=t3
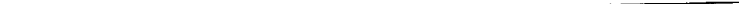
FIG.4(E) t=t4
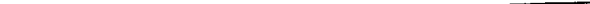
FIG.4(F) t=t5

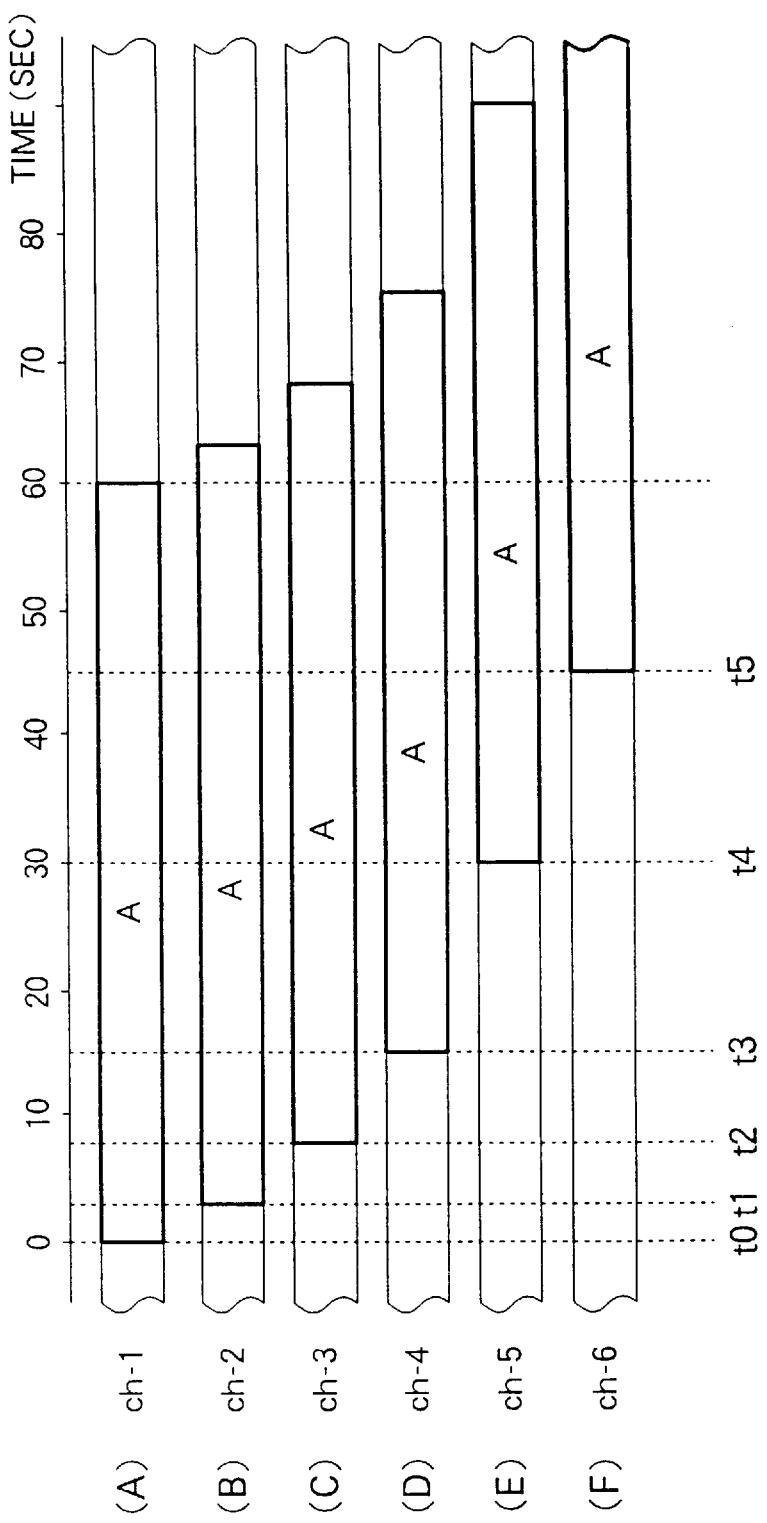

AUDIO-VIDEO DATA TRANSMISSION APPARATUS, AUDIO-VIDEO DATA TRANSMISSION SYSTEM AND AUDIO-VIDEO DATA SERVER

BACKGROUND OF THE INVENTION

1. Field of the Invention

The present invention relates to a data transmission apparatus suitable for use in for example a near-video-on-demand (NVOD) system able to deliver audio and video (AV) data upon request and to an audio and video data server provided with a plurality of the same.

2. Description of the Related Art

Realization of a video-on-demand (VOD) system which can instantaneously provide program data in response to requests from receivers has long been desired. A VOD system which can respond to individual requests made at any time, however, would require a data transmission apparatus which could handle extremely large scale, complicated processing.

Therefore, an NVOD system has been proposed which can function similarly to a VOD system but requires a simpler configuration of the data transmission apparatus. The NVOD system transmits program data over a plurality of channels at predetermined time intervals and responds to requests made within certain time zones by selecting the channel of the program starting from the next time zone and sending that program.

In a system for transmitting program data like the NVOD system, however, it is sometimes not possible to provide the program data suitably in response to the request of a receiver. That is, when the time interval between the program data being transmitted in parallel is too long, one cannot really say that the receiver can view the program data almost instantaneously.

The time interval between program data being transmitted in parallel is in many cases determined by the number of channels which can be used for the transmission of a single program. For example, sometimes the time for reproduction of the program data divided by the number of channels is used as the time interval between program data and the program data is sent over the plurality of channels staggered equally by that time interval.

As a result of this, however, if trying to transmit a program with a relatively long reproduction time, the time interval becomes long and a problem arises in terms of the "instantaneousness" of the response. For example, when offering a two-hour long program, the program would start at 30 minute intervals in the case of use of four channels or 15 minute intervals in the case of use of eight channels, so a waiting time of as long as 30 minutes or 15 minutes would be required.

This means that if trying to shorten the maximum waiting time, it is necessary to increase the number of channels used for a single program. For example, if trying to keep the maximum waiting time in a program of about two hours length mentioned earlier to 5 minutes, use of 24 channels would be required. If using such a large number of channels for a single program, the problem would arise of the number of types of the programs offered as a whole becoming smaller.

SUMMARY OF THE INVENTION

Accordingly, the object of the present invention is to provide a data transmission apparatus which can effectively respond to requests from receivers.

To achieve the object, there is provided an audio-video (AV) data transmission apparatus comprising: an AV data storage means for storing AV data forming a program and having audio data and/or video data; a reference time generating means for generating a signal showing a predetermined reference time; a reproducing means for reading out the stored AV data and preparing a plurality of AV data for a plurality of channels, contents of the plurality of AV data being identical and forming the single program, the plurality of AV data being formed as reproducible from the beginning of the program in order at predetermined time intervals from the reference time, and being shorter the predetermined time intervals with channels reproducing the AV data closer to the reference time; and a data transmitting means for converting the plurality of AV data into a plurality of AV data having a predetermined transmission format and transmitting the same to a plurality of transmission channels.

Preferably, the AV data storage means and the reproducing means are formed integral as an AV data storage and reproducing means, the AV data storage and reproducing means having a mass storage apparatus for storing the plurality of AV data and buffer memory, the AV data storage and reproducing means reading out the stored AV data at different positions of the same program and at positions equal to the number of channels from the mass storage means at a speed equal to the normal reproduction speed of the program times the number of channels and storing the same in the buffer memory.

Also, to achieve the object, there is provided an AV data transmission system, comprising a plurality of AV data transmission apparatuses, each AV data transmission apparatus including: an AV data storage means for storing AV data forming a program and having audio data and/or video data; a reference time generating means for generating a signal showing a predetermined reference time; a reproducing means for reading out the stored AV data and preparing a plurality of AV data for a plurality of channels, contents of the plurality of AV data being identical and forming the single program, the plurality of AV data being formed as being reproducible from the beginning of the program in order at predetermined time intervals from the reference time, and being shorter the predetermined time intervals with channels reproducing the AV data closer to the reference time; and a data transmitting means for converting the plurality of AV data into a plurality of AV data having a predetermined transmission format and transmitting the same to a plurality of transmission channels, the AV data storage means and the reproducing means are formed integral as an AV data storage and reproducing means, the AV data storage and reproducing means having a mass storage apparatus for storing the plurality of AV data and buffer memory, the AV data storage and reproducing means reading out the stored AV data at different positions of the same program and at positions equal to the number of channels from the mass storage means at a speed equal to the normal reproduction speed of the program times the number of channels and storing the same in the buffer memory, to thereby transmit a plurality of program from a plurality of transmission apparatuses.

Preferably, the reference time is defined as a preset time for transmission of the AV data.

Also, to achieve the object, there is provided an AV data server comprising: a program providing means for providing a plurality of program information including AV data including audio and/or video signals; a selector for selecting the program information input from the program providing means; and a plurality of AV data transmission apparatuses each of which is input a program information selected by the selector, each of the AV data transmission apparatuses comprising; an AV data storage means for storing AV data forming a program and having audio data and/or video data, a reference time generating means for generating a signal showing a predetermined reference time, a reproducing means for reading out the stored AV data and preparing a plurality of AV data for a plurality of channels, contents of the plurality of AV data being identical and forming the single program, the plurality of AV data being formed as being reproducible from the beginning of the program in order at predetermined time intervals from the reference time, and being shorter the predetermined time intervals with channels reproducing the AV data closer to the reference time, and a data transmitting means for converting the plurality of AV data into a plurality of AV data having a predetermined transmission format and transmitting the same to a plurality of transmission channels.

Preferably, the AV data storage means and the reproducing means are formed integral as an AV data storage and reproducing means, the AV data storage and reproducing means having a mass storage apparatus for storing the plurality of AV data and buffer memory, the AV data storage and reproducing means reading out the stored AV data at different positions of the same program and at positions equal to the number of channels from the mass storage means at a speed equal to the normal reproduction speed of the program times the number of channels and storing the same in the buffer memory.

BRIEF DESCRIPTION OF THE DRAWINGS

These and other objects and features of the present invention will become clearer from the following description of the preferred embodiments made with reference to the accompanying drawings, wherein

FIGS. 4A to 4F are views of the data blocks simultaneously read out from the data transmitter shown in FIG. 2, wherein FIG. 4A is a view of the read data at the time to (0 minute on each hour) where the first data stream starts to be generated, FIG. 4B is a view of the read data at the time t1 (3 minutes on each hour) where the second data stream starts to be generated, FIG. 4C is a view of the read data at the time t2 (8 minutes on each hour) where the third data stream starts to be generated, FIG. 4D is a view of the read data at the time t3 (15 minutes on each hour) where the fifth data stream starts to be generated, FIG. 4E is a view of the read data at the time t4 (30 minutes on each hour) where the fifth data stream starts to be generated, and FIG. 4F is a view of the read data at the time t5 (45 minutes on each hour) where the sixth data stream starts to be generated; and FIGS. 5A to 5F are views of the data streams generated in the data transmitter shown in FIG. 2, that is, the first to sixth data streams output from channel 1 to channel 6.

DESCRIPTION OF THE PREFERRED EMBODIMENTS

Individual receivers request to view programs at all times of the day, but viewers as a whole tend to request program data at certain specific times. For example, one can easily understand that there would be a large number of receivers requesting viewing of a new program at the time zone when usual transmitted television programs change or at certain well defined time zones such as 0 minute on every hour or at 30 minutes on every hour.

The present invention was made taking this tendency for occurrence of requests into account and seeks to transmit program data over a plurality of channels in a manner so as to reduce the average waiting time of the system as a whole.

A first embodiment of the data transmission apparatus of the present invention will be explained next with reference to FIG. 1 to FIGS. 5A to 5F.

The data transmission apparatus of the first embodiment is used for transmitting data in a NVOD system and transmits programs so as to enable receivers requesting the programs to receive them at substantially the time of their requests.

Figure 1:
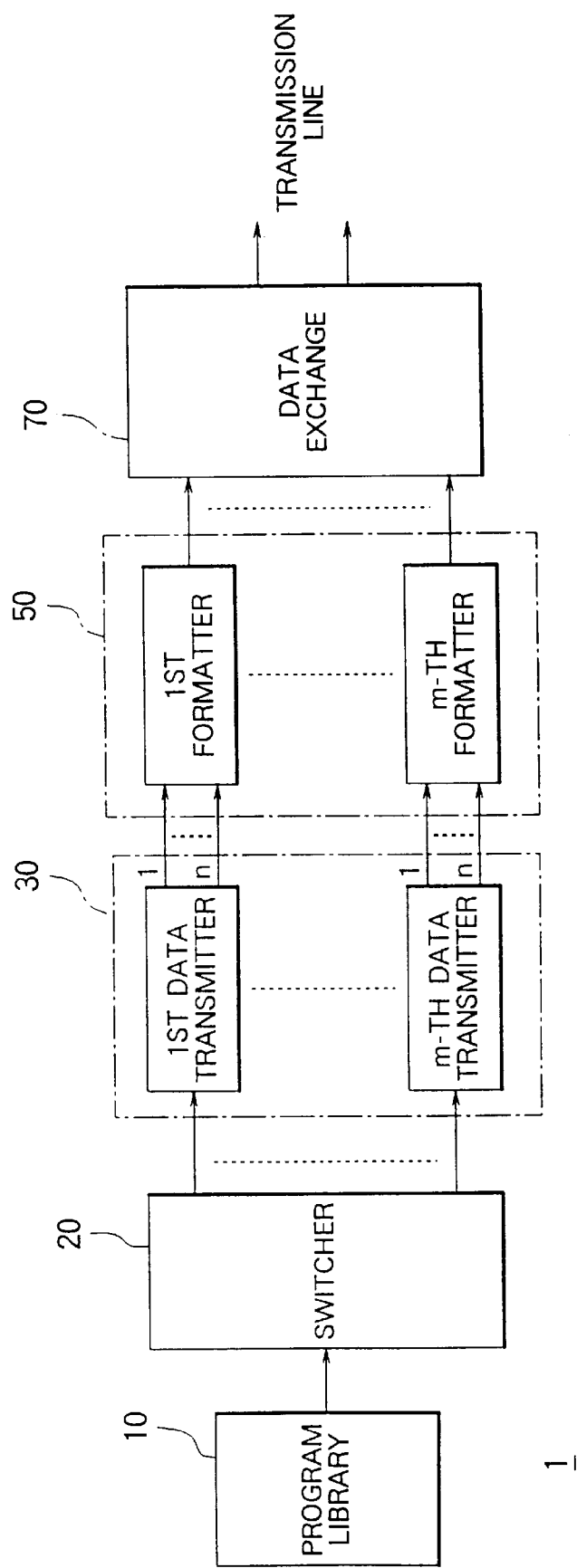
FIG. 1 is a view of the configuration of the data transmission apparatus according to the present invention.

FIG. 1 is a view of the configuration of the data transmission apparatus of this embodiment.

The data transmission apparatus 1 comprises a program library 10, switcher 20, data transmitter 30, formatter 50, and data exchange 70.

Note that the data transmission apparatus 1 has a controller, not shown, and performs predetermined operations based on control signals from the controller at predetermined timings synchronized with the same.

First, an explanation will be made of the configurations of the individual units of the data transmission apparatus 1 referring to FIG. 1.

The program library 10 is a data recording apparatus which stores a plurality of programs offered by the NVOD system. The program data which is stored in the program library 10 and shortly scheduled to be transmitted is appropriately transferred to a data transmitter 30. The program library 10 must record a huge amount of data. In this embodiment, use is made of an MO autochanger apparatus which automatically selects from a plurality of magneto-optic (MO) discs using an autochanger and performs the recording and reproduction of data to and from the selected MO disc.

The switcher 20 is a means for switching to which of the first data transmitter $30_{-1}$ to m-th data transmitter $30_{-m}$ of the data transmitter 30 the program data from the program library 10 is to be input.

The data transmitter 30 is comprised of the first data transmitter $30_{-1}$ to the m-th data transmitter $30_{-m}$. The data transmitters $30_{-i}$ (i=1 to m) record the program data input from the program library 10 in recorders in the data transmitters $30_{-1}$, reproduce the recorded program data at a high speed to generate a maximum of n number of program data streams, and output them simultaneously from n number of channels.

Figure 2:
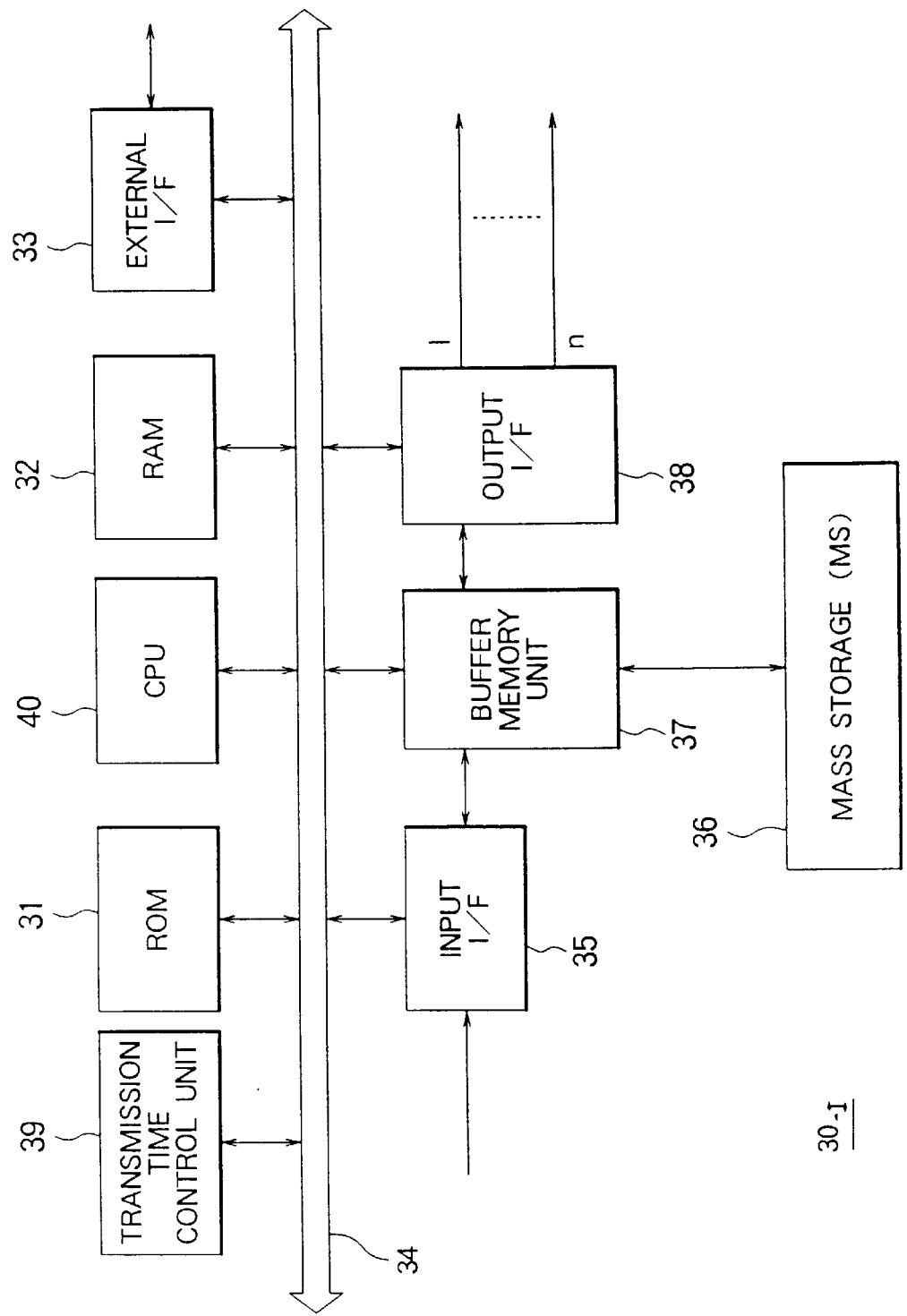
FIG. 2 is a view of the configuration of a data transmitter of the data transmission apparatus shown in FIG. 1.

A more detailed explanation will be given of the configuration of this data transmitter 30 referring to FIG. 2.

The data transmitters $30_{-i}$ of the data transmitter 30 are each comprised of a read only memory (ROM) 31, random access memory (RAM) 32, external interface 33, bus 34, input interface 35, mass storage 36, buffer memory unit 37, output interface 38, transmission time control unit 39, and central processing unit (CPU) 40.

The ROM 31 stores the programs to be executed by the CPU 40.

The RAM 32 is the main memory used when the CPU 40 executes various operations.

The external interface 33 is an interface of the data transmission apparatus 1 with a controller, not shown.

The bus 34 is a data bus for transferring data among units in the data transmitters $30_{-i}$. For example, data is transferred between the CPU 40 and the RAM 32 over this bus 34.

The input interface 35 is an interface for input of program data transferred from the switcher 20. The input program data is stored in the mass storage 36 through the buffer memory unit 37.

The mass storage 36 is a large capacity, randomly accessible data storage apparatus comprised of a hard disc memory, magneto-optic disc (MO) memory, etc. and records the program data transferred from the program library 10.

The buffer memory unit 37 has a buffer memory of a capacity corresponding to at least the physical data transfer block of the mass storage 36 and controls the transfer of program data among the mass storage 36, the bus 34, the input interface 35, and the output interface 38.

The output interface 38 transfers the program data output from the mass storage 36 through the buffer memory unit 37 to the formatter 50.

The transmission time control unit 39 detects the timing at which the data transmitters $30_{-i}$ start the generation of a new program data stream and informs this timing to the CPU 40. The transmission time control unit 39 has a memory for setting the reference time from the outside and a clock for counting the time. First, the starting time of the main data stream of the program data is set as the reference time in the memory from the outside. Based on this starting time, the CPU 40 finds the starting times of the other data streams and stores the times in the memory in the transmission time control unit 39. When the time counted by the clock reaches the starting time of a data stream, a signal is sent to the CPU 40 to that effect.

The CPU 40 controls the units in the data transmitters $30_{-i}$ in accordance with commands from the controller and a program stored in the ROM 31. More specifically, first, it controls the input interface 35 and the buffer memory unit 37 to store the program data input from the program library 10 in the mass storage 36. Next, it finds the starting times of the data streams based on the reference time set in the transmission time control unit 39 from the outside and stores the same in the memory of the transmission time control unit 39. Further, it reads out the program data from the mass storage 36 to generate new program data streams and outputs the same through the output interface 38 to the formatter 50 based on signals showing that the time for generation of the program data streams input from the transmission time control unit 39 has arrived.

Note that in this embodiment, the starting times of the data streams are found as follows:

First, the first data stream is set to start at the reference time recorded in the transmission time control unit 39. Next, the fourth to sixth data streams are set to start at times staggered by ¼ the reproduction time of the program. Further, the second and third data streams are set to start at times of 3/15th and 5/15th this time between the starting times of the first and fourth data streams.

The data transmitter $30_{-i}$ is for example realized by such a configuration. Next, an explanation will be made of the configuration of the different units of the data transmission apparatus 1.

The formatter 50 is comprised of the first formatter $50_{-1}$ to the m-th formatter $50_{-m}$. The formatters $50_{-i}$ (i=1 to m) give the program data streams output from the channels of the data transmitter $30_{-i}$, error correction codes, add destination information and other headers, convert them to a predetermined transmission format based on the transmission method, and multiplex n number of program data streams for output to the data exchange 70. Note that in this embodiment, it is assumed that the program data is transmitted by the ATM (asynchronous transfer mode) system. Accordingly, in the formatter $50_{-i}$, ATM cells for transmission by the ATM are assembled from the program data streams, multiplexed, and output to the data exchange 70.

The data exchange 70 is connected to a transmission line over which the data output from the formatter $50_{-i}$ (i=1 to n) of the formatter 50 is transmitted.

Next, an explanation will be given of the operation of the data transmission apparatus 1 of the present invention.

Note that in this embodiment, the explanation is given of the operation of the data transmission apparatus 1 illustrating the case of transmitting the data of a program A of a reproduction time of 60 minutes from six channels.

Figure 3:
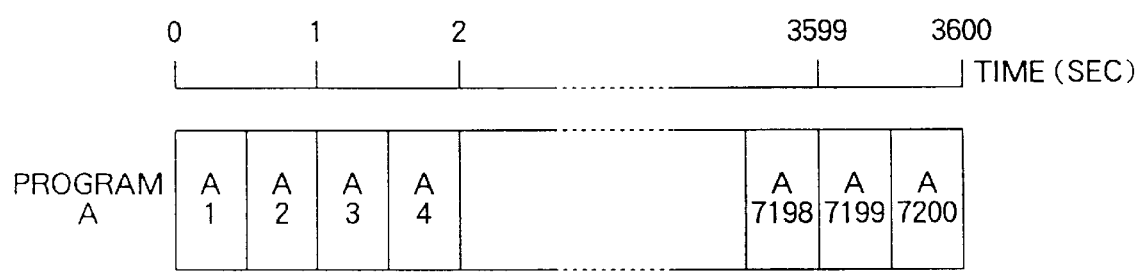
FIG. 3 is a view of the configuration of the program data transmitted in the data transmission apparatus shown in FIG. 1.

The data of the program A is shown in FIG. 3. The data of the program A is transferred and otherwise processed in units of data of 0.5 second reproduction time (15 frames worth of signals). Accordingly, the data of the 60 minute long program A is comprised of 7200 data blocks A1 to A7200. Note that both of the video data and the audio data of the program is encoded by high-efficiency coding system.

First, the data of the 60 minute program A is input from the program library 10 through the switcher 20 to any data transmitter $30_{-i}$ (i=1 to m) in the data transmitter 30. In this embodiment, it is assumed it is input to the first data transmitter $30_{-1}$. Note that the data of the program A need not be transferred in real time in this case. Further, it may be transferred at any time before the start of the transmission of data.

The data of the program A input to the data transmitter $30_{-1}$, is recorded from the input interface 35 through the mass storage 36 in the buffer memory unit 37. Next, the starting time of the first data stream among the data streams of the program A is set in the memory in the transmission time control unit 39. This data stream is preferably set to start basically at the time when the largest number of viewers watch this program A. Note that the data stream set to start from here is referred to as the "first data stream".

As in this embodiment, in a data transmission apparatus used for an NVOD system where the identical program data stream is repeatedly transmitted from the channels, it is possible to set the starting times of the repeated data streams or set a single starting time and have the following starting times automatically set based on the reproduction time of the program data.

In this embodiment, the data from the beginning of the program A is set to be generated as the first data stream at 0 minute on each hour.

Next, the times for starting the generation of the second to sixth data streams after the first data stream among the six data streams generated for the program A are set. This is done by find the time delay of the data streams from the first data stream using predetermined rules and adding the delay times to the starting time of the first data stream set in the memory of the transmission time control unit 39. At this time, further, the delay times are made narrower in the time zone near the starting time of the first data stream and the delay times of the data streams are made longer the further from the starting time of the first data stream.

In this embodiment, the fourth to sixth data streams are set to be started from times staggered one-quarter of the reproduction time of the program A (in this embodiment, 60 minutes), while the second and third data streams are set to start at times 3/15th and 8/15th of that time between the starting times of the first and fourth data streams.

More specifically, in the second to sixth data streams, the data from the beginning of the program A is started at times staggered from the first data stream by 3 minutes, 8 minutes, 15 minutes, 30 minutes, and 45 minutes.

Note that the starting times of the data streams are computed and found in the CPU 40 based on rules stored in advance in the RAM 32. The starting times of the data streams which are found are stored once again in the memory in the transmission time control unit 39.

In the transmission time control unit 39, the time shown by the clock provided in the transmission time control unit 39 and the preset time are compared. Based on the results of the comparison, a signal is output from the transmission time control unit 39 to the CPU 40 for the reproduction of the data of the program A from the beginning and the generation of data streams. By this, the CPU 40 reads out the desired data block in the mass storage 36 through the buffer memory unit 37 and outputs them to the formatter 50 through the output interface 38. Due to this, six data streams staggered by the above times are generated and output from the channels 1 to 6 of the output interface 38.

A more detailed explanation will be given, referring to FIGS. 4A to 4F and FIGS. 5A to 5F, of the state of reading out the data of the program A recorded in the mass storage 36 and the data streams generated. Note that FIGS. 4A to 4F and FIGS. 5A to 5F show the state of reading out the data from a certain time during which the data streams are already being repeatedly generated and those data streams.

FIG. 4 is a view of the data blocks simultaneously read out from the mass storage 36. As shown in FIG. 4, the data transmitter 30_1 accesses the data of the program A recorded in the mass storage 36, reads out the data blocks required for generating the data streams, and outputs them to the channels.

Further, at that time, the data of a reproduction time of 0.5 second is read out in a maximum time of 0.5/6 second.

For example, at 0 minute (time t0) on each hour when the first data stream to be output to the first channel starts to be generated, as shown in FIG. 4A, six data blocks are read out in 0.5 second: the first data A1 of the program data to be output to the first channel, the data A6841 of the location 3 minutes after the first channel (57 minutes on) to be output to the second channel, the data A6241 of the location a further 5 minutes from the second channel (52 minutes on) to be output to the third channel, the data A5401 of the location 7 minutes after the third channel (45 minutes on) to be output to the fourth channel, and the data A3601 and A1801 of the locations 15 minutes each after the fourth channel (30 minutes on and 15 minutes on) to be output to the fifth and sixth channels.

Subsequently, in the same way, the data is read out as shown in FIGS. 4B to 4F at 3 minutes, 8 minutes, 15 minutes, 30 minutes, and 45 minutes after each hour.

As a result, six data streams are generated as shown in FIGS. 5A to 5F and are output by the channel 1 (ch1) to channel 6 (ch6).

The data streams output to the formatter 50 are input to the first formatter 50_1 in the formatter 50 where each data stream is given an error correction code and provided with destination information or other headers. ATM cells are assembled for transmission by an ATM and are further multiplexed and output to the data exchange 70. The program data output to the program exchange 70 is supplied through a transmission line.

In this way, the data transmission apparatus 1 of this embodiment supplies 60 minute program data using six channels. The program data streams of the channels are supplied staggered 3 minutes, 5 minutes, 7 minutes, 15 minutes, 15 minutes, and 15 minutes from the data stream started at the beginning at 0 minute on each hour. That is, the program data is transmitted at short time intervals in the time zone near 0 minute on each hour which is when television programs change etc. and when a larger number of viewers start viewing new programs.

Accordingly, compared with supplying the program data at 10 minute intervals using six channels, it is possible to effectively respond to requests from a larger number of viewers. That is, the average waiting time of the viewers can be reduced and the program data can be effectively supplied.

Note the present invention is not limited to these embodiments and can be modified in various ways.

For example, in the data transmitters $30_{-i}$ (i=1 to m) of the embodiment, the program data was recorded in the mass storage 36 in an ordinary data format and that recorded data was randomly accessed to simultaneously read out a plurality of locations corresponding to a plurality of data streams. However, if the time intervals between data streams to be transmitted are set, then the order of the data read out is also decided, so the data can be recorded in that order. That is, the data can be recorded on the recording medium in the order shown from FIGS. 4A to 4F. By recording it in this way, it is possible to reduce the seek time and search time when reading out the data. This is effective when desiring to reduce the access time of the data even a little such as when transmitting data in parallel over a plurality of channels.

Further, in this embodiment, the explanation was made of the case of use of the data transmission apparatus of the present invention for a NVOD system, but the invention is not limited to an NVOD system. For example, it may be used for supplying ordinary programs for cable television etc. In this case, it is sufficient to use the first channel for supplying the program data based on an ordinary program guide and use the second channel and on for supplying the data at successive later times. By doing this, a viewer which has missed the starting time of a program due to some reason or another despite intending to view it at the predetermined time can be effectively sent the program data by just selecting the channel started later. Note that in this case too, it is effective to make the time interval between data streams shorter the closer the time zone to the starting time of the first channel.

Further, in this embodiment, the transmission time of the first data stream was made 0 minute on each hour, but may be set to any time other than this as well. For example, if the program server is one which can indicate the time of transmission of the program, then that time may be made the time of transmission of the first data stream. Further, in the case where the time of transmission is not particularly set, for example, in an NVOD system, any time where the viewer can easily start viewing may be made the time of transmission of the first data stream. At that time, the time of transmission of the other data streams is set in accordance with the time for reproduction of the program. Specifically, if the program is two hours long, then for example the time of transmission of the first data stream may be made 18:00, 20:00, 22:00 . . . , while if the program is one hour and 30 minutes long, the time of transmission may be set to 18:00, 19:30, 21:00, . . .

Further, the program library 10 is not limited to an MO autochanger apparatus, that is, use may be made of a large capacity hard magnetic disc device or a recording device using VTR tape. Further, the recording capacity may be any capacity suited to the number of channels of the NVOD system and the number of programs offered.

Further, the transmission of the signal indicating that the time has arrived for generating the program data stream from the transmission time control unit 39 to the CPU 40 may be performed by transfer of data through the bus 34 or performed through an interruption signal of the CPU 40.

According to the data transmission apparatus of the present invention, it is possible to transmit program data at short time intervals in a time zone where there are a large number of requests from receivers, so it is possible to shorten the average waiting time of receivers and possible to efficiently respond to requests from receivers.

What is claimed is:

1. An audio-video (AV) data transmission apparatus comprising:

AV data storage means for storing AV data forming a program;

reference time generating means for generating a signal showing a predetermined reference time;

reproducing means for reading out the stored AV data and preparing a plurality of AV data for a plurality of channels, said plurality of AV data each forming said program; and data transmitting means for converting said plurality of AV data into a plurality of AV data having a predetermined transmission format and transmitting the same, starting at said predetermined reference time, on respective transmission channels at predetermined time intervals, said predetermined time intervals being shorter in time for that AV data transmitted by said data transmitting means which are closer in time to said predetermined reference time.

2. An AV data transmission apparatus as set forth in claim 1, wherein said AV data storage means and said reproducing means are formed integral as an AV data storage and reproducing means, the AV data storage and reproducing means having mass storage means for storing said plurality of AV data and buffer memory, said AV data storage and reproducing means reading out said stored AV data at different positions of the same program and at positions equal to the number of channels from the mass storage means at a speed equal to the normal reproduction speed of the program times the number of channels and storing the same in the buffer memory.

3. An AV data transmission system, comprising a plurality of AV data transmission apparatuses, each AV data transmission apparatus including:

AV data storage means for storing AV data forming a program;

reference time generating means for generating a signal showing a predetermined reference time;

reproducing means for reading out the stored AV data and preparing a plurality of AV data for a plurality of channels, said plurality of AV data each forming said program; and data transmitting means for converting said plurality of AV data into a plurality of AV data having a predetermined transmission format and transmitting the same, starting at said predetermined reference time, on respective transmission channels at predetermined time intervals, said predetermined time intervals being shorter in time for that AV data transmitted by said data transmitting means which are closer in time to said predetermined refernce time, said AV data storage means and said reproducing means are formed integral as an AV data storage and reproducing means, the AV data storage and reproducing means having mass storage means for storing said plurality of AV data and buffer memory, said AV data storage and reproducing means reading out said stored AV data at different positions of the same program and at positions equal to the number of channels from the mass storage means at a speed equal to the normal reproduction speed of the program times the number of channels and storing the same in the buffer memory, to thereby transmit a plurality of programs from the data transmission means.

4. An AV data transmission system as set forth in claim 3, wherein said reference time is defined as a preset time for transmission of the AV data.

5. An AV data server comprising:

program providing means for providing a plurality of program information including AV data;

selector for selecting said program information input from said program providing means; and plurality of AV data transmission apparatuses each of which is input a program information selected by said selector, each of the AV data transmission apparatuses comprising:
   AV storage means for storing the AV data forming a program, reference time generating means for generating a signal showing a predetermined reference time, reproducing means for reading out the stored AV data and preparing a plurality of AV data for a plurality of channels, said plurality of AV data each forming said program, and data transmitting means for converting said plurality of AV data into a plurality of AV data having a predetermined transmission format and transmitting the same, starting at said predetermined reference time, on respective transmission channels at predetermined time intervals, said predetermined time intervals being shorter in time for that AV data transmitted by said data transmitting means which are closer in time to said predetermined reference time.

6. An AV data transmission apparatus as set forth in claim 5, wherein said AV data storage means and said reproducing means are formed integral as an AV data storage and reproducing means, the AV data storage and reproducing means having a mass storage means for storing said plurality of AV data and buffer memory, said AV data storage and reproducing means reading out said stored AV data at different positions of the same program and at positions equal to the number of channels from the mass storage means at a speed equal to the normal reproduction speed of the program times the number of channels and storing the same in the buffer memory.

7. An AV data transmission apparatus as set forth in claim 1, further comprising control means for controlling the timing of said predetermined time intervals, wherein said control means determines a first predetermined time interval to a time when there is a tendency for the largest number of viewers to request said program, thereby reducing average waiting time.

8. An AV data transmission apparatus as set forth in claim 7, wherein said control means determines said timing for said predetermined time intervals based on the length of said program.

* * * * *